United States Patent
Hsu et al.

(10) Patent No.: US 7,837,336 B2
(45) Date of Patent: Nov. 23, 2010

(54) PROJECTION DEVICE AND COLOR WHEEL FOR USE THEREWITH

(75) Inventors: Mao-Shan Hsu, Taoyuan County (TW); Yu-Hsi Wu, Taoyuan County (TW)

(73) Assignee: Delta Electronics, Inc., Taoyuan County (TW)

(*) Notice: Subject to any disclaimer, the term of this patent is extended or adjusted under 35 U.S.C. 154(b) by 1013 days.

(21) Appl. No.: 11/611,088

(22) Filed: Dec. 14, 2006

(65) Prior Publication Data

US 2007/0258057 A1 Nov. 8, 2007

(30) Foreign Application Priority Data

May 3, 2006 (TW) .............................. 95115796 A

(51) Int. Cl.
*G03B 21/14* (2006.01)
(52) U.S. Cl. ........................................ 353/84; 359/892
(58) Field of Classification Search ................... 353/84; 359/889, 892; 349/5–9; 348/742, 743, 771
See application file for complete search history.

(56) References Cited

U.S. PATENT DOCUMENTS

| | | | | |
|---|---|---|---|---|
| 6,054,832 A | * | 4/2000 | Kunzman et al. | 318/600 |
| 6,155,687 A | * | 12/2000 | Peterson | 353/84 |
| 6,474,818 B1 | * | 11/2002 | Engle | 353/84 |
| 6,769,776 B1 | * | 8/2004 | Chen et al. | 353/84 |
| 6,874,892 B1 | * | 4/2005 | McDaniel | 353/84 |
| 6,971,752 B2 | * | 12/2005 | Lee | 353/84 |
| 7,347,568 B2 | * | 3/2008 | Jin | 353/84 |
| 2003/0214740 A1 | * | 11/2003 | Wong et al. | 359/892 |
| 2005/0248690 A1 | * | 11/2005 | Kim | 348/743 |
| 2007/0102637 A1 | * | 5/2007 | Chang et al. | 250/338.1 |
| 2008/0074626 A1 | * | 3/2008 | Lu et al. | 353/84 |
| 2008/0079909 A1 | * | 4/2008 | Lu | 353/84 |
| 2008/0278694 A1 | * | 11/2008 | Wu et al. | 353/84 |

FOREIGN PATENT DOCUMENTS

| | | |
|---|---|---|
| JP | 2005-352187 | 12/2005 |
| JP | 2006-113276 | 4/2006 |
| JP | 2006-203366 | 8/2006 |
| JP | 2006-259437 | 9/2006 |

* cited by examiner

*Primary Examiner*—William C Dowling
(74) *Attorney, Agent, or Firm*—Patterson Thuente Christensen Pedersen, P.A.

(57) ABSTRACT

A projection device comprises a color wheel module, wherein, the color wheel can be detached from the color wheel module. The color wheel module can be detached from the body of the projection device, so that users can conveniently change, clean or maintain the color wheel as desired.

16 Claims, 5 Drawing Sheets

PROJECTION DEVICE AND COLOR WHEEL FOR USE THEREWITH

This application benefits from the priority of Taiwan Patent Application No. 095115796 filed on May 3, 2006.

CROSS-REFERENCES TO RELATED APPLICATIONS

Not applicable

BACKGROUND OF THE INVENTION

1. Field of the Invention

The present invention relates to a projection device with a replaceable color wheel; in particular, it relates to a color wheel module which is detachably disposed inside a projection device.

2. Descriptions of the Related Art

Various types of projectors, such as digital light processing (DLP), liquid crystal display (LCD) and liquid crystal on silicon (LCOS), have been developed over recent years to cater to different customers. Now referring to the DLP projector as an demonstrative example, the DLP projector uses a micro electro mechanical system (MEMS), which employs a digital micromirror device (DMD) created by the Texas Instruments (TI) company. Generally speaking, the imaging principle of a DLP projector is as follows: (1) light projects from a light source, (2) a color wheel separates the color into green, blue, and red, (3) a light tunnel integrates the separated lights, (4) the DMD processes the lights and input signals of the images to drive the micro mirrors of the DMD, and (5) a lens receives the light and images from the DMD and projects a visible image onto a screen after a final image treatment. Compared to other types of projectors, the DLP has a high quality of brightness, color reproduction and contrast. The DLP also minimizes the volume of the projector.

Because image quality performance of DLP projectors is important, manufacturers have focused more on the research and development of DLP projectors to further promote the capabilities of the DLP projectors.

Generally, conference rooms require projectors with high brightness and large screens. Therefore, a color wheel with four color sectors (red, green, blue and white) is needed for the conference room. A color wheel with only the red, green and blue sector will offer a quality to reinforce color contrast, saturation and fidelity for home theater. However, in the current market, none of the projectors provides users the ability to change the color wheel of the projector themselves. Any replacement or maintenance of a color wheel must be sent back to the dealer. Furthermore, for technicians, detaching the color wheel from a projector during repair and maintenance requires complicated procedures, resulting in overall inconvenience for both users and technicians.

Because maintenance or replacement of products should be convenient for the end users and technicians, user-friendly products are very important to designers. Since projection devices are costly, customers are often limited to the purchase of a product without a replaceable color wheel. Therefore, a design that not only allows users to change the color wheels under different circumstances, but also allows technicians to conveniently clean, repair or replace the color wheel, is desired.

SUMMARY OF THE INVENTION

The primary objective of this invention is to provide a projection device that allows users to change, clean or maintain the color wheel. This objective is achieved by modularizing the color wheel and its peripheral components. The projection device includes a color wheel module which is selectively detachable from a main body of the projection device.

Another objective of this invention is to provide a color wheel module for use with a projection device that allows users to change, clean or maintain the color wheel as desired. The color wheel module comprises a color wheel which is detachably disposed inside the color wheel module.

The projection device and the color wheel module of the present invention not only enhance the diversity of usage of the projection device, but also prolong the service life of the projection device.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
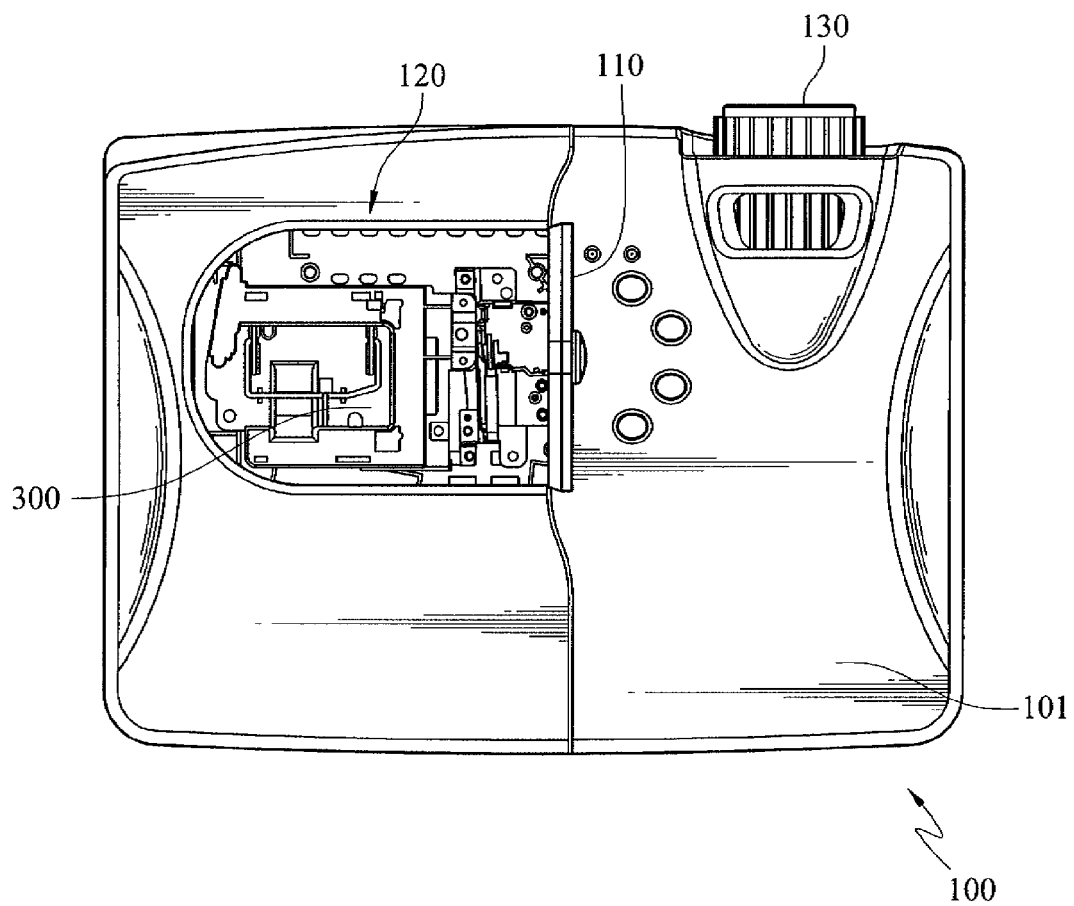
FIG. 1 is a schematic top view showing the projection device of the present invention with its cover open.
Figure 2A:
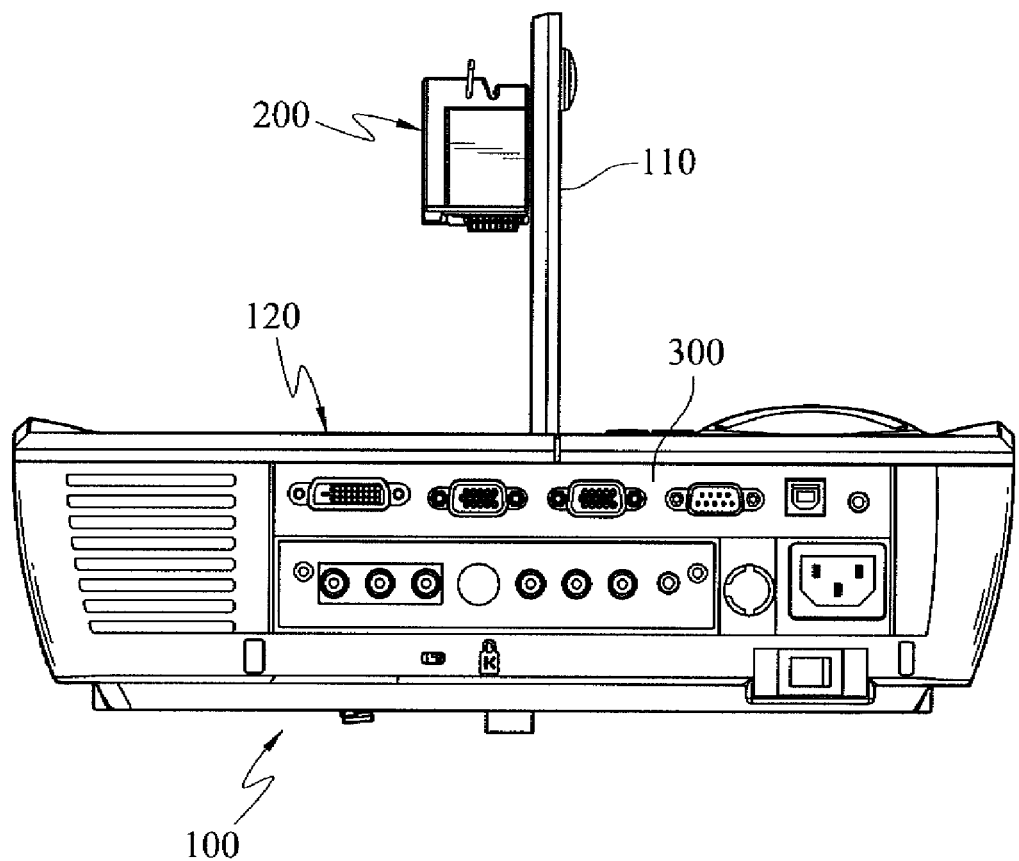
FIG. 2(a) is an elevational side view of FIG. 1.
Figure 2B:
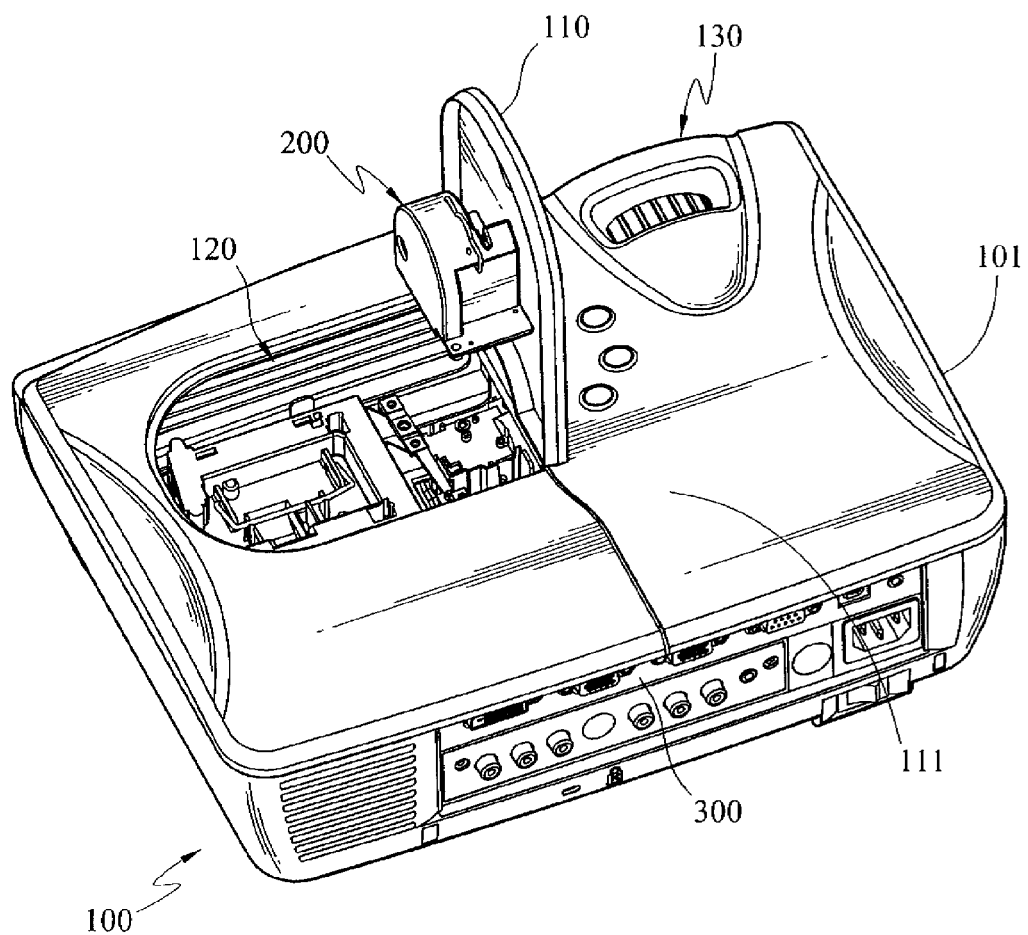
FIG. 2(b) is a perspective view of FIG. 1.

FIG. 1, FIG. 2(a), FIG. 2(b), and FIG. 4 are referred to in this document simultaneously The features of the present invention are focused on the modular technique of the color wheel in view of a projector using the same. Therefore, the following descriptions only involve the color wheel module of the projection device 100 and its peripheral components. Redundant descriptions of other constructions not relating to the color wheel are not given here.

The projection device 100 primarily comprises a color wheel module 200, a power supply (not shown), a coupling device (not shown), and a main circuit board 300. The color wheel module 200 is disposed on a main body 101 of the projection device 100, preferably, on a cover 110 of a top portion 111 of the main body 101. The cover 110 can be associated with a lamp lid to integrally pivot on the top portion 111 for the users' convenience in opening or closing the cover 110. This arrangement also simplifies assembly and controls cost. By opening the cover, the color wheel module 200 is exposed for replacement, change and maintenance from the main body 101 of the projection device 100. Preferably, the arrangement between the color wheel module 200 and the main body 101 is separable to facilitate the users' handling of the internal components of the module 200. The main circuit board 300 is adapted for providing image processing and power management of the projection device 100.

It is noted that the cover 110 does not need to be disposed on the top portion 111 of the main body 101. Other portions of the main body 101, such as a side portion or a bottom portion (not shown) is acceptable for the location of the cover 110, as long as the placement can fit onto other components of the device 100 to form a reasonable arrangement.

Moreover, the projection device 100 further comprises a receiving recess 120 formed in the main body 101 for holding the color wheel module 200. After the color wheel module 200 is disposed inside the receiving recess 120, the cover 110 can be closed so that the color wheel module 200 is positioned in the receiving recess 120. After the desired color light beams are processed by the light source of the projection device 100, the light beams can travel into the DMD for imaging.

Figure 3:
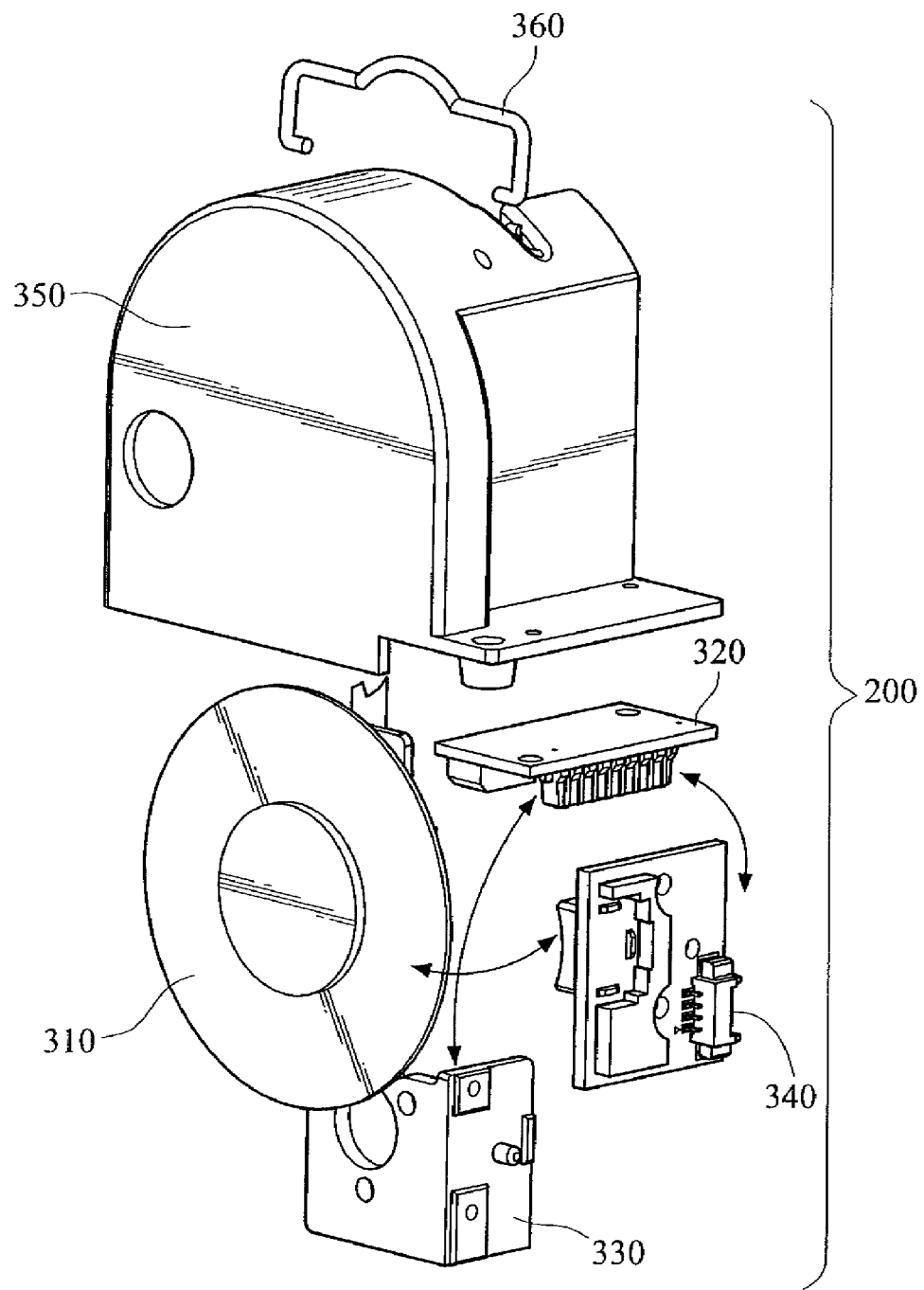
FIG. 3 is a schematic view showing the components of the color wheel module of the present invention.

In FIG. 3, the color wheel module 200 preferably comprises a color wheel 310, which is disposed in a housing 350 of the color wheel module 200 in any detachable way. As a result, the user can not only detach the color wheel module 200 from the projection device 100, but also separate the color wheel 310 from the color wheel module 200 of the housing 350, thereby freely changing color wheels with different specifications as desired.

Specifically, the color wheel module 200 shown in the FIG. 3 is an optional embodiment of the present invention. In a typical configuration, the color wheel module 200 further comprises a connector and a driver. The connector can be a daughter board 320, while the driver can be a motor 330. In general, the daughter board 320 electrically connects to the power supply and signal transmission device of the main circuit board 300 of the projection device 100, while the motor 330 electrically connects to the color wheel 310. The motor 330 is used for rotating the color wheel 310. The motor 330 comprises a power wire (not shown) for connecting the power supply, which offers electric power for the motor 330. Generally speaking, the color wheel module 200 receives electric power through the main circuit board 300. In this embodiment, the color wheel module 200 electrically connects to the main circuit board 300 through the daughter board 320. In other words, the color wheel module 200 can be electrically connected to the main circuit board 300 of the projection device 100 through the daughter board 320 to get power and transmit image signals. It is understandable that the color wheel module 200 may electrically connect to the main circuit board 300 directly or through other channels without using the daughter board 320.

The color wheel module further comprises an index board 340 for determining color sectors of the color wheel 310. The index board 340 further comprises a signal wire (not shown) which can connect to the daughter board 320 or directly connect to the main circuit board 300. It is understandable that the index board 340 can be disposed within the color wheel module 200 of the projection device, or onto other places of the projection device 100 according to the present invention.

More specifically, the daughter board 320 and the motor 330 are disposed in the housing 350. Certainly, the daughter board 320, the motor 330, and the index board 340 can be disposed together in the housing 350. Preferably, the housing 350 comprises an engaging device (not shown) which allows detachability from the projection device 100. The engaging device may be disposed on the main body 101 of the projection device 100 such that the whole color wheel module 200 is separable from the main body 101. To facilitate user handling of the color wheel module 200, the housing 305 can further comprises a handle spring 360 which is disposed on the top portion of the housing 305. The force that is applied to the handle spring 306 allows the color wheel module 200 to be removed from, or securely inserted into the main body 101 (or its cover 110) of the projection device 100. Thus, it is convenient for users to change, clean or maintain different color wheel modules as desired.

Figure 4:
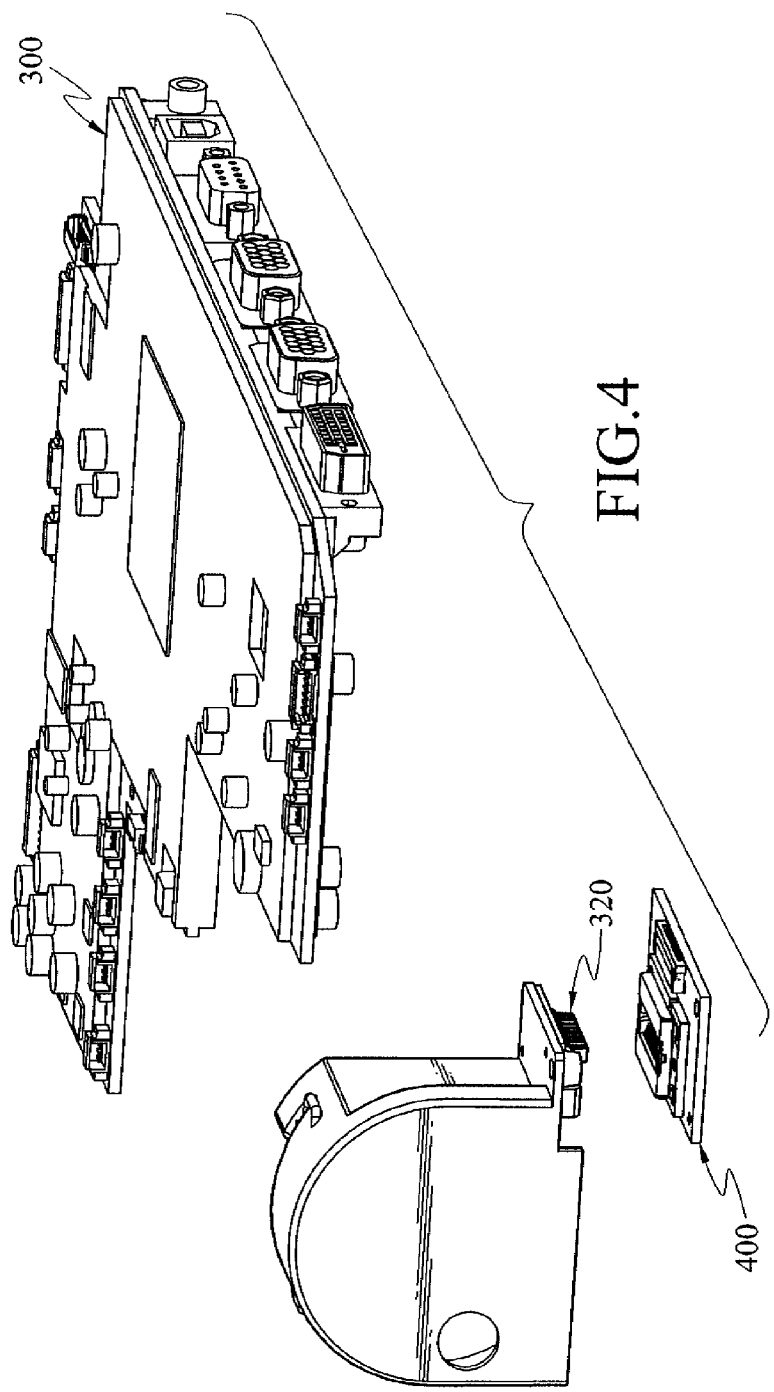
FIG. 4 is a schematic view showing the connection between the color wheel module and other peripheral components of the present invention.

FIG. 4 shows the relationship between the daughter board 320, a coupling device 400, and the main circuit board 300 of the main body (not shown in this figure). The daughter board 320 electrically connects to the coupling device 400, while the coupling device 400 electrically connects to the main circuit board 300 to transmit image signals and supply power.

A further alternative embodiment is provided to differentiate the aforesaid embodiment. The difference is that the color wheel module of this embodiment is not disposed inside a housing. In other words, the color wheel module, the daughter board, the motor, and even the index board, are directly disposed onto the main body. Still, the users can easily replace those components as desired without disassembling the projection device. In short, the color wheel or the color wheel module as mentioned in the aforesaid embodiments is detachable from the main body of the projection device. There is no need to dissemble the whole projection device or take other components (e.g. lamp, optical engine, lens, light tunnel, mother circuit board, control panel or housing) out of the projection device for replacing the color wheel.

The above disclosure is related to the detailed technical contents and inventive features thereof, but not limited to the claimed subject matter. For example, the color wheel module can be disposed in the projection device other than the cover. The color wheel module does not need to be placed within a housing. The peripheral components, such as the daughter board, the motor and desired connecting circuits, can be bundled together form an open type module. Furthermore, the handle spring of the color wheel module can be replaced with other equivalents, as long as it allows users to conveniently detach the color wheel module from the projection device. As mentioned above, the index board can be removed from the module and placed in the projection device to reduce the weight of the color wheel module. The main circuit board is not merely limited to image processing, though this is its basic capability. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projection device, comprising:
   a main body;
   a power supply;
   a coupling device; and
   a color wheel module, wherein the color wheel module is detachably disposed in the main body, and the color wheel module comprises:
   a color wheel;
   a housing, wherein the color wheel is detachably disposed in the housing;
   a daughter board for electrically connecting to the power supply and the coupling device; and
   a motor for electrically connecting to the color wheel and the daughter board, the motor being adapted for driving the color wheel,
   wherein the color wheel module transmits signal with the coupling device through the daughter board.

2. The device as claimed in claim 1, wherein the color wheel module further comprises:
   an index board for electrically connecting to the daughter board to determine color sectors of the color wheel.

3. The device as claimed in claim 1, wherein the daughter board and the motor are disposed with the housing, which is detachably disposed on the main body of the projection device.

4. The device as claimed in claim 2, wherein the daughter board, the motor, and the index board are disposed on the housing, which is detachably disposed on the main body of the projection device.

5. The device as claimed in claim 3, wherein the color module further comprises a handle spring disposed on the housing so that the color wheel module is adapted to be removed from the main body by applying an external force onto the handle spring.

6. The device as claimed in claim 4, wherein the color module further comprises a handle spring disposed on the housing so that the color wheel module is adapted to be removed from the main body by applying an external force onto the handle spring.

7. The device as claimed in claim 1, wherein the main body comprises a cover pivoting on a top portion of the main body, and the color wheel module is detachably disposed under the cover.

8. The device as claimed in claim 1, wherein the main body comprises a cover pivoting on a side area of the main body, and the color wheel module is detachably disposed under the cover.

9. The device as claimed in claim 1, wherein the main body comprises a cover pivoting on a bottom area of the main body, and the color wheel module is detachably disposed under the cover.

10. A color wheel module for a projection device, wherein the projection device comprises a main body, a power supply and a coupling device, the color wheel module comprising:
   a color wheel being detachably disposed in the main body;
   a daughter board for electrically connecting to the power supply and the coupling device; and
   a motor for electrically connecting to the color wheel and the daughter board, the motor being adapted for driving the color wheel,
   wherein the color wheel module transmits signal with the coupling device through the daughter board.

11. The color wheel module as claimed in claim 10, wherein the color wheel module further comprises:
   an index board for electrically connecting to the daughter board to determine color sectors of the color wheel.

12. The color wheel module as claimed in claim 10, wherein the daughter board and the motor are disposed with the main body.

13. The color wheel module as claimed in claim 11, wherein the daughter board, the motor and the index board are disposed on the main body.

14. A color wheel module for a projection device, wherein the projection device comprises a main body, a power supply and a coupling device, the color wheel module is disposed on the main body, the color wheel module comprises:
   at least one peripheral element;
   a color wheel being detachably disposed on the at least one peripheral element;
   a daughter board for electrically connecting to the power supply and the coupling device; and
   a motor for electrically connecting to the color wheel and the daughter board, the motor is adapted for driving the color wheel,
   wherein the color wheel module transmits signal with the coupling device through the daughter board.

15. The color wheel module as claimed in claim 14, wherein the least one peripheral element comprises a housing, and the color wheel is detachably disposed in the housing.

16. The color wheel module as claimed in claim 14, wherein the color wheel module further comprises:
   an index board for electrically connecting to the daughter board to determine color sectors of the color wheel.

* * * * *